Patented Feb. 11, 1936

2,030,633

UNITED STATES PATENT OFFICE 2,030,633

ADHESIVE COMPOSITION AND PROCESS OF MAKING THE SAME

Harry E. Holcomb, Stratford, Conn., assignor to Johns-Manville Corporation, New York, N. Y., a corporation of New York No Drawing. Application January 13, 1932, Serial No. 586,454

12 Claims. (Cl. 134—23.9)

This invention relates to an adhesive composition and process of making the same, and particularly to one comprising a protein. A preferred embodiment of the invention is an emulsion of an alkaline, aqueous solution of a protein with a liquid that is immiscible with the aqueous solution and is readily volatile. An example is an emulsion of gasoline with a solution of casein in water containing sodium hydroxide.

An object of the invention is to extend or increase the volume of a casein or other adhesive, by means of emulsification with an immiscible liquid, with preservation of the strength of the film that may be produced from the adhesive. Another object is to provide an adhesive composition which, although containing a minimized quantity of adhesive substance per gallon of solution, is relatively viscous. A further object of the invention is to provide an adhesive composition which, on drying in a fibrous composition, will not close the pores between the fibers. An additional object is to provide an adhesive, suitably one containing casein, which, on the evaporation of the volatile material therefrom, will leave a film that is strong, durable, weatherproof, and/or fire-resistant. Other objects and advantages will appear from the detailed description which follows.

It is conventional to prepare adhesives from protein substances, such as casein or gelatin in an impure form, known as "glue". It is conventional also to have various inorganic chemicals present in the adhesives so prepared, to improve the properties or to facilitate the solution of the protein in water during the preparation. Thus, it is customary to make casein adhesives by dissolving casein in water containing an inorganic salt or an alkali, as, for example, trisodium phosphate, borax, sodium hydroxide, or sodium carbonate.

In connection with casein adhesives, for example, many observations of importance have been recorded. Thus, Tague, in his book on casein, published in 1926, says, on page 144, "Dilute solutions of casein have very little adhesive properties. Concentrated solutions must always be used in this class of substances." Again, on page 145, he says, "The presence of fats or soaps is very destructive to adhesive strength."

It will appear from the following description that I have made a casein adhesive, for example, which does not have the appearance or the properties ordinarily associated with being dilute and yet contains a reduced quantity of casein per gallon of the adhesive composition. It will appear also that I have accomplished this purpose without the introduction of fats or soluble soaps.

In general, there is made an aqueous solution or composition of adhesive that is relatively concentrated, that is, one adapted to form a strong adhesive film on drying. This composition is then emulsified with an immiscible, readily volatile diluent or extender, such as gasoline.

The invention will be illustrated by the following example of a casein adhesive and process of preparing the same. All proportions given in this example or elsewhere in the specifications and claims are parts by weight, unless otherwise stated.

The casein used may be a commercial grade, such as one adapted to give an aqueous solution of relatively low viscosity and sold as "B-1 Casein", in granular or meal form. 25 parts of such commercially dry casein are swollen by soaking for approximately one-half hour in 32 parts of water. The swollen casein is then dissolved, or formed into a fairly clear mixture, with a solution of approximately 2 parts sodium hydroxide in 7 parts of water. This dissolving requires some time for its completion, usually 15 to 20 minutes, and is facilitated by agitating the swollen casein with the sodium hydroxide solution until practically all grains of casein disappear. The solution of casein and sodium hydroxide in water is then mixed with or emulsified with approximately 115 parts of a mixture of substantially equal volumes of water and low-boiling gasoline. This mixing is accomplished by means of thorough agitation, as, for example, that produced by a high speed propeller. The mixing is more readily made at an elevated temperature. For this reason the mixture of water and gasoline, which is added to the casein solution, is suitable at a temperature of about 60° C. at the time of being added. When the warmed mixture of water and gasoline is stirred into the alkaline, aqueous solution of casein, a very pronounced change occurs. There is produced what appears to be an almost uniform milky product that is viscous, in fact, more viscous than was the solution of casein in the aqueous alkali before the additional water and gasoline were added. This is very significant inasmuch as the increased viscosity is accompanied by an increase in volume, whereas such a large dilution by water alone would produce a pronounced lowering of the viscosity. Although the improved composition, diluted with the water and gasoline mixture, is sufficiently viscous to adapt it for use as a viscous adhesive, a typical composition of this kind contains only 15 to 25 ounces of casein for approximately a gallon of the finished adhesive.

In addition to the property of being very viscous in proportion to the content of casein per gallon of finished product, the improved adhesive has certain other interesting properties. The adhesive is adapted to cement one object to another, or fibers to each other, in such manner as to give an adhesive film that, after drying, is thin and yet adherent. Also, the adhesive composition shows a relatively high drying shrinkage on evaporation of the solvents, that is, a very small ratio of final net weight to the weight of the original emulsion used, and the resulting adhesive has a porous, honeycombed structure which maintains the adhesive in an extended, large overall volume.

While it is not necessary to the invention to explain why the finished unit comprising the new adhesive admits incident sound, it is a fact that the film structure of binder or adhesive produced as described contains a multiplicity of closely and irregularly spaced, irregularly extending, intercommunicating pores corresponding to escape channels of vapor of the emulsified gasoline or the like. For this reason in part, the process of the wetting of a fibrous material with the adhesive, shaping the resulting composition, and allowing the volatile ingredients of the adhesive composition to evaporate, produces an article in which the voids or pores between the individual fibres are not closed by the adhesive. This fact makes possible the manufacture of a highly permeable, molded product comprising fibers adhesively secured together by means of the casein adhesive. Another important property of the improved adhesive composition is the minimized tendency to migration of the casein during the drying of a highly porous article containing the adhesive. This may be illustrated in the case of a block comprising mineral wool fibers adhered together by moistening the fibers with casein adhesive, shaping, and then drying. During drying, the casein does not form a thick, heavy coating over the outer surface of the block, but remains well distributed throughout the entire block, with only a minimized migration to the outer surface. In distinction from this is the result on drying a block of mineral wool fibers wetted with an aqueous gel, such as one of starch; during drying of such a block with the aqueous starch gel binding material there is pronounced migration of the starch to the surface, with the consequent forming of a thick surface crust which requires removal, as by sawing, to expose a surface of texture and permeability desired for certain purposes, such as the absorption of sound.

It is not essential to the invention to explain the unusual properties of the improved adhesive. It is possible that the high viscosity obtained, even with the extended casein composition, is due to the emulsification of the aqueous solution of casein in a liquid that is immiscible with, that is, insoluble in the aqueous solution of casein. Also, it is possible that the minimized migration of the binder, during the drying of a fibrous block wetted throughout with the binder, is due to the possible discontinuity of the aqueous phase of the emulsion over the fibers at some stage of the drying process, to the evaporation of the gasoline at a greater rate than that at which the water evaporates, with a consequent substantial decrease in the volume of the adhesive in the block, before the water begins to evaporate in large amount, and/or to the existence of inner surfaces in the fibrous composition, from which water may evaporate without migration to an outer surface.

The utility of the improved adhesive composition made as described above, may be illustrated by the manufacture of a block comprising mineral wool fibers bonded with the adhesive, and adapted to absorb incident sound. An adhesive composition, made as above and comprising approximately 25 parts of casein, is mixed with 65 parts of nodulated rock wool fibers, this being a form of mineral wool made by the melting and blowing of an argillaceous limestone, and then forming the resulting fibrous product into small clusters, or nodules, as by passing the fibers through a fan, to produce small aggregations, and then tumbling in a revolving drum with perforated sides to separate slag particles. The mixture of casein adhesive and nodulated wool is then shaped in a frame, at substantially no pressure, or just sufficient pressure to smooth the surface, as by rolling. The shaped mass is then preferably allowed to stand at approximately atmospheric temperature for about a day, after which it is dried, as, for example, at 200° F. The product, after thorough drying, is practically free from the odor of gasoline, is hard and rigid, and may be cut to the exact size desired, as by sawing. The block, either before or after removing the original surfaces by sawing, is adapted to admit and to absorb incident sound.

Variations may be made from the details given, without departing from the scope of the invention. Thus, the proportions may be varied within limits. For example, the casein adhesive may be made to contain different proportions of the various ingredients, such as 20 to 35 parts of casein, 1 to 2 or more parts of sodium hydroxide, approximately 60 to 150 parts of water, and about 30 to 110 parts of gasoline.

A typical adhesive so made has the following approximate composition: 25 parts of casein, 2 of sodium hydroxide, 117 of water, and 50 of low boiling gasoline.

Also, other materials may be used. Thus, there may be used, in place of the solution of casein in water containing sodium hydroxide, another aqueous or alkaline aqueous adhesive mixture, as, for example, a protein such as glue dissolved in water or in an aqueous mixture. In place of sodium hydroxide there may be used another alkaline compound of an alkali metal, such as potassium hydroxide, sodium carbonate, trisodium phosphate, borax, or another inorganic material adapted to facilitate the solution of the protein in water. However, best results for many purposes are obtained when the metal compound used is a caustic alkali, preferably sodium hydroxide. The immiscible liquid preferred for mixing with the aqueous solution of the protein is low-boiling gasoline or so-called aviation gasoline. A gasoline, that has been used satisfactorily, has a density of approximately 63° Bé. and a boiling range of 104° F. to 303° F. Other water-insoluble, readily volatile, organic liquids may be used as a substitute for the low-boiling gasoline, as, for example, ethylene dichloride or another liquid hydrocarbon, such as motor gasoline, benzol, or toluol. It will be noted that the several organic liquids described are chemically inert, that is, substantially non-reactive with the ingredients forming the aqueous solution or adhesive composition. Except in special cases, the immiscible liquid should be unsaponifiable, in order to avoid the presence of fats in the original adhesive composition and the possible formation of soluble soaps by action with the alkali present. The immiscible liquid is used in substantial proportion, say, 20% or more, suitably about 40% of the weight of the other ingredients that are emulsified with the immiscible liquid.

When the casein adhesive, for example, is allowed to evaporate, as in a block containing a large proportion of rock wool fibers, there is formed a film comprising the solid content of the adhesive composition. This film is tenacious but is combustible and not waterproof.

When it is desired to make the film water-resistant or weatherproof, a waterproofing agent may be added to the original adhesive composition. Thus, aluminum stearate may be mixed with the gasoline which is added during the preparation of the adhesive composition. The proportion of stearate may be varied, within limits. A proportion which gives satisfactory weatherproofing for most purposes, without adding excessively to the cost of the adhesive, is 2 to 3 parts of aluminum stearate to every 25 parts of casein to which the gasoline solution of the stearate is to be added. When the stearate is mixed with the gasoline, there is produced a white, milky mixture which becomes almost or quite clear when the gasoline is mixed with approximately an equal volume of hot water that raises the temperature of the resulting water, gasoline and aluminum stearate mixture to about 60° C. As an alternative material for the aluminum stearate, as waterproofing agent, there may be used some other material adapted to produce negative capillarity for water, as, for example, zinc stearate. In some cases, a water-repellent, non-volatile wax may be used, although particularly satisfactory results have been found from the use of aluminum stearate or an equivalent stearate.

In preparing an adhesive composition which, on drying, will give a fire-resistant film, there is added one or more fireproofing materials. The fireproofing material may consist of a salt of a multivalent metal adapted to decrease the rate of combustible material associated with the said salt, suitably one that, in crystalline form, is highly hydrated. There have been used, with satisfaction, hydrated salts of aluminum, such as potash or soda alum, or aluminum sulfate (so-called "paper maker's alum").

The method of making the adhesive film fire-resistant may be illustrated by the case in which the material added for that purpose is potash alum. A solution of casein in aqueous sodium hydroxide is made as described above. To this solution there is then added potash alum dissolved in a minimum quantity of water. The proportion of alum used may be 2 or more parts for each 25 of casein present in the solution to which the alum is to be added. After the alum has been incorporated, the gasoline and additional water are then added and mixed in, as already described. The effect of such a fire-proofing material containing a salt of a multivalent metal may include formation of a metal compound with the casein or a hydroxide precipitated by the alkali present. Whatever changes occur between the alum, for example, sodium hydroxide, and/or casein in the solution are made use of in the process.

The resulting block of rock wool fibers adhesively secured together by means of the casein composition resulting from the addition of alum to the other ingredients of the composition, as described, is fire-resistant, although not entirely fireproof. Combustion initiated in the block, by means of a gas burner, becomes extinguished a few minutes after the gas flame is removed.

In some cases it may be desired to make a colored adhesive, as, for example, for use in the manufacture of a colored block of fibers cemented together by means of the adhesive. This may be accomplished by adding suitable pigments or dyes to the adhesive. The pigments or dyes used should be adapted for coloring casein, or other adhesive substances used, in the presence of the alkali or other materials present. As pigments, there may be used one or more of a great variety, as, for example, an iron oxide, chrome yellow, or chrome green. As dyes, there have been used satisfactorily direct dyes. In incorporating the coloring substance, such as a pigment or a dye, the coloring substance is suitably admixed with the solution of casein in the aqueous alkali before the gasoline or other immiscible liquid is added.

Certain disclosures herein made are claimed in an application Serial Number 586,455 for U. S. patent, filed on even date herewith by Harry E. Holcomb and entitled "Porous material and process of making the same".

Since many variations from the illustrative details that have been given may be made without departing from the scope of the invention, it is intended that the invention should be limited only by the terms of the claims.

What I claim is:

1. A viscous composition of matter adapted for use as an adhesive comprising an aqueous adhesive composition and a substantial proportion of a water-insoluble, unsaponifiable, readily volatile, organic liquid emulsified with the aqueous adhesive, the said organic liquid being substantially non-reactive with the adhesive composition.

2. A composition of matter, adapted for use as an adhesive, comprising an alkaline aqueous solution of an adhesive in relatively concentrated form and a water-insoluble, unsaponifiable, readily volatile, organic liquid emulsified with the aqueous solution, said organic liquid being substantially non-reactive with the adhesive composition.

3. A composition of matter, adapted for use as an adhesive, comprising an alkaline aqueous solution of a protein in relatively concentrated form and a water-insoluble, unsaponifiable, readily volatile, organic liquid emulsified with the aqueous solution, the said organic liquid being substantially non-reactive with the adhesive composition.

4. A composition of matter, adapted for use as an adhesive, comprising an alkaline aqueous solution of glue and a substantial proportion of a water-insoluble, unsaponifiable, readily volatile, organic liquid emulsified with the aqueous solution, the said organic liquid being substantially non-reactive with the adhesive composition.

5. A composition of matter, adapted for use as an adhesive, comprising an aqueous solution of casein in relatively concentrated form and alkaline compound adapted to facilitate solution of the casein and a water-insoluble, readily volatile organic liquid, the said liquid being substantially non-reactive with the casein and alkaline compound and emulsified with the aqueous solution.

6. An emulsion comprising the reaction products of an intimate mixture of approximately 20 to 35 parts of protein of the type of casein, a small proportion of alkaline compound of the type of sodium hydroxide, 60 to 150 parts water, and 30 to 110 parts readily volatile liquid of the type of gasoline.

7. An emulsion comprising the reaction products of an intimate mixture of approximately 25 parts of casein, 2 parts sodium hydroxide, 117 parts water, and 50 parts low boiling gasoline.

8. An emulsion comprising the reaction products of an intimate mixture of approximately 20 to 35 parts of casein, 1 to 2 parts sodium hydroxide, 60 to 150 parts water, 30 to 110 parts gasoline, and a coloring substance.

9. A composition of matter comprising the reaction products of an intimate mixture of casein, water, an alkali, a sulphate of alumina, and gasoline, the said composition being in the form of an emulsion of the several ingredients thereof.

10. The preparation of an adhesive by a process comprising swelling approximately 25 parts of casein with approximately 32 parts of water, dissolving the swollen casein in a solution containing approximately 2 parts sodium hydroxide and approximately 7 parts water, and then emulsifying the dissolved casein with about 115 parts of a mixture of substantially equal volumes of water and low boiling gasoline.

11. The preparation of an adhesive by a process comprising swelling approximately 25 parts of casein with approximately 32 parts of water, dissolving the swollen casein in a solution containing approximately 2 parts sodium hydroxide and approximately 7 parts water, adding approximately 3 parts of alum to the dissolved casein, and then emulsifying the resulting mixture with about 115 parts of a mixture of substantially equal volumes of water and low boiling gasoline.

12. In the preparation of an adhesive composition, the method which comprises forming a relatively concentrated aqueous solution of an alkali protein and then intimately emulsifying the solution with a readily volatile liquid that is insoluble in the said aqueous solution and substantially non-reactive therewith.

HARRY E. HOLCOMB.

DISCLAIMER 2,030,633.—*Harry E. Holcomb*, Stratford, Conn. ADHESIVE COMPOSITION AND PROCESS OF MAKING THE SAME. Patent dated February 11, 1936. Disclaimer filed October 5, 1939, by the assignee, *Johns-Manville Corporation*.
Hereby enters this disclaimer to claim 1 in said specification.
[*Official Gazette October 31, 1939.*]